(12) United States Patent
Pommier et al.

(10) Patent No.: US 11,692,459 B2
(45) Date of Patent: Jul. 4, 2023

(54) METHOD FOR MANUFACTURING A TURBINE ENGINE PART AND THE THEREBY PRODUCED PART

(71) Applicant: SAFRAN AIRCRAFT ENGINES, Paris (FR)

(72) Inventors: Nicolas Pommier, Moissy Cramayel (FR); Mathieu Bissardon, Moissy Cramayel (FR); Mathieu Delalandre, Moissy Cramayel (FR); Stephane Nicolas Piron, Moissy Cramayel (FR); Olivier Renon, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/655,748

(22) Filed: Mar. 21, 2022

(65) Prior Publication Data
US 2022/0213807 A1  Jul. 7, 2022

Related U.S. Application Data

(63) Continuation of application No. 15/409,852, filed on Jan. 19, 2017, now Pat. No. 11,346,250.

(30) Foreign Application Priority Data

Jan. 21, 2016 (FR) ..................... 16 50492

(51) Int. Cl.
*F01D 25/24* (2006.01)
*F02C 6/08* (2006.01)
(Continued)

(52) U.S. Cl.
CPC .......... *F01D 25/24* (2013.01); *F01D 17/145* (2013.01); *F01D 25/162* (2013.01); *F01D 25/30* (2013.01);
(Continued)

(58) Field of Classification Search
CPC ...... F01D 17/145; F01D 25/14; F01D 25/162; F01D 25/24; F01D 25/30; F02C 6/08;
(Continued)

(56) References Cited

U.S. PATENT DOCUMENTS 2,896,906 A * 7/1959 Durkin ............... F01D 25/12
 415/115
3,286,461 A * 11/1966 Johnson ............... F02C 7/27
 416/95
(Continued)

FOREIGN PATENT DOCUMENTS

FR  3 018 114 A1  9/2015
WO  2005/012696 A1  2/2005
(Continued)

OTHER PUBLICATIONS

Search Report issued in French Patent Application No. 1650492 dated Oct. 3, 2016 (with English translation of categories of cited documents).

*Primary Examiner* — Christopher R Legendre
(74) *Attorney, Agent, or Firm* — Oblon, McClelland, Maier & Neustadt, L.L.P.

(57) ABSTRACT

A method for manufacturing a turbine engine part in which a first rough casting element includes a first face and a second face opposite to each other is assembled by the second face on an orifice which has a second element of the part. The method includes machining a through-cavity in the first element which opens at the first face and from the second face of the first element and machining the first face of the first element so as to form an area suitable for ensuring the attachment of a conduit on the first element. The machining of the cavity and of the first face is achieved by using a machining reference frame based on the second element.

10 Claims, 7 Drawing Sheets

(51) Int. Cl.
  *F02C 7/32* (2006.01)
  *F01D 25/16* (2006.01)
  *F01D 17/14* (2006.01)
  *F01D 25/30* (2006.01)

(52) U.S. Cl.
  CPC .............. *F02C 6/08* (2013.01); *F02C 7/32* (2013.01); *F05D 2220/30* (2013.01); *F05D 2230/10* (2013.01); *F05D 2230/232* (2013.01); *F05D 2230/60* (2013.01); *Y02T 50/60* (2013.01)

(58) Field of Classification Search
  CPC ............. F02C 7/32; F05D 2230/10–18; F05D 2230/232; F05D 2230/60
  See application file for complete search history.

(56) References Cited

U.S. PATENT DOCUMENTS

| | | | |
|---|---|---|---|
| 5,134,844 A | 8/1992 | Lee | |
| 6,782,702 B2 | 8/2004 | Charon | |
| 7,266,941 B2 | 9/2007 | Eleftheriou | |
| 7,696,451 B2 | 4/2010 | Bourdin | |
| 8,888,427 B2 | 11/2014 | Ruppert | |
| 10,240,532 B2 | 3/2019 | Scott | |
| 11,346,250 B2 * | 5/2022 | Pommier | .................. F02C 7/32 |
| 2007/0241257 A1 | 10/2007 | Eleftheriou et al. | |
| 2007/0280819 A1 | 12/2007 | Eleftheriou et al. | |
| 2008/0010970 A1 | 1/2008 | Eleftheriou et al. | |
| 2008/0010996 A1 | 1/2008 | Eleftheriou et al. | |
| 2008/0014083 A1 | 1/2008 | Eleftheriou et al. | |
| 2008/0014084 A1 | 1/2008 | Eleftheriou et al. | |
| 2013/0224012 A1 | 8/2013 | Durocher | |
| 2014/0053563 A1 | 2/2014 | De Sousa | |
| 2014/0165533 A1 | 6/2014 | Eleftheriou et al. | |
| 2015/0345400 A1 | 12/2015 | Scott et al. | |
| 2017/0211420 A1 | 7/2017 | Pommier | |
| 2018/0195416 A1 | 7/2018 | Jouy | |
| 2022/0213807 A1 * | 7/2022 | Pommier | .................. F02C 7/32 |

FOREIGN PATENT DOCUMENTS

| | | |
|---|---|---|
| WO | 2014/143329 A2 | 9/2014 |
| WO | 2015/175076 A2 | 11/2015 |

\* cited by examiner

METHOD FOR MANUFACTURING A TURBINE ENGINE PART AND THE THEREBY PRODUCED PART

CROSS-REFERENCE TO RELATED APPLICATIONS

This application is a continuation of U.S. application Ser. No. 15/409,852 filed Jan. 19, 2017, the entire contents of which is incorporated herein by reference. U.S. application Ser. No. 15/409,852 claims the benefit of priority from prior French Application No. 16 50492 filed Jan. 21, 2016.

GENERAL TECHNICAL FIELD

The present invention relates to a method for manufacturing a turbine engine part, and notably aircraft turbine engines, giving the possibility of obtaining a final shape of the final part which is as close as possible to the shape determined during the design of said part.

The present invention also relates to the part which is obtained by the manufacturing method. The part may notably be a turbine rear frame of a turbine engine.

More specifically, the present invention relates to a manufacturing method wherein the part is obtained by assembling two elements, both elements may notably be an outer shroud of a turbine rear frame and a mouth for attachment of an output tube of a transient exhaust valve of the turbine engine.

STATE OF THE ART

During the manufacturing of a turbine engine part which requires the assembling of a first element and of a second element, it is known how to achieve manufacturing of said part according to the following steps:
  Providing the first element and the second element, the first element being a rough casting element. The first element comprises a rough casting cavity in its center which entirely crosses said first element.
  Assembling the first and the second element, for example by welding the first element on the second element. More specifically, the assembling of both elements is achieved by positioning the first element on a pierced hole which is made in the second element, so that once both elements are assembled, the cavity formed in the first element crosses said first element as well as the second element.
  Machining a first face of the first element so that this first face is suitable for being attached to a conduit. The machining may for example consist in surfacing said first surface before flattening it, followed by making several pierced holes which may be tapped, which form means allowing attachment with the conduit. In order to ensure the proper alignment of the rough casting cavity of the first element and of the conduit which will be attached to the first face of said first element, the machining of the pierced holes is achieved by using a machining reference frame based on the walls of the rough casting cavity of the first element.

However, such a manufacturing method does not give the possibility of obtaining a satisfactory machining of the first element, and therefore does not give the possibility of obtaining the required accuracy for assembling the conduit to the first element. Indeed, the deformations of the first element and of the second element due to the assembling (notably when the assembling is carried out by welding) may cause inaccuracies in the machining of the first face of the first element, notably in the positioning of the pierced holes. These uncertainties in the machining may subsequently require the use of corrective solutions which complexify the part, may make it heavier and cause a manufacturing over cost.

This accuracy problem is again found in the machining notably for manufacturing a turbine rear frame (or TRF) for a turbine engine, and notably for an aircraft turbine engine wherein the weight of the turbine engine is a very important parameter.

Figure 1:
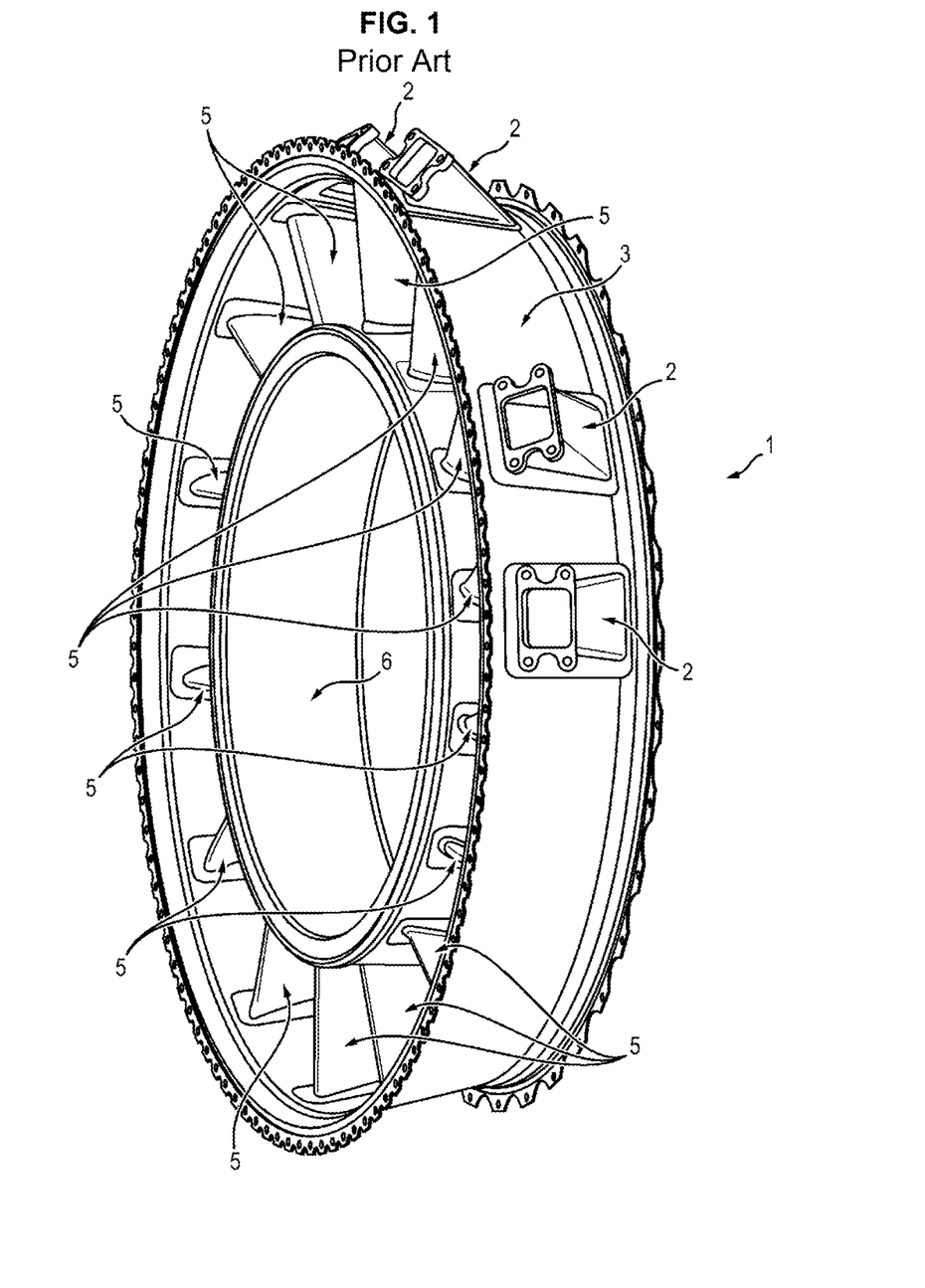
FIG. 1 illustrates a turbine rear frame for a turbine engine according to the state of the art.
Figure 2:
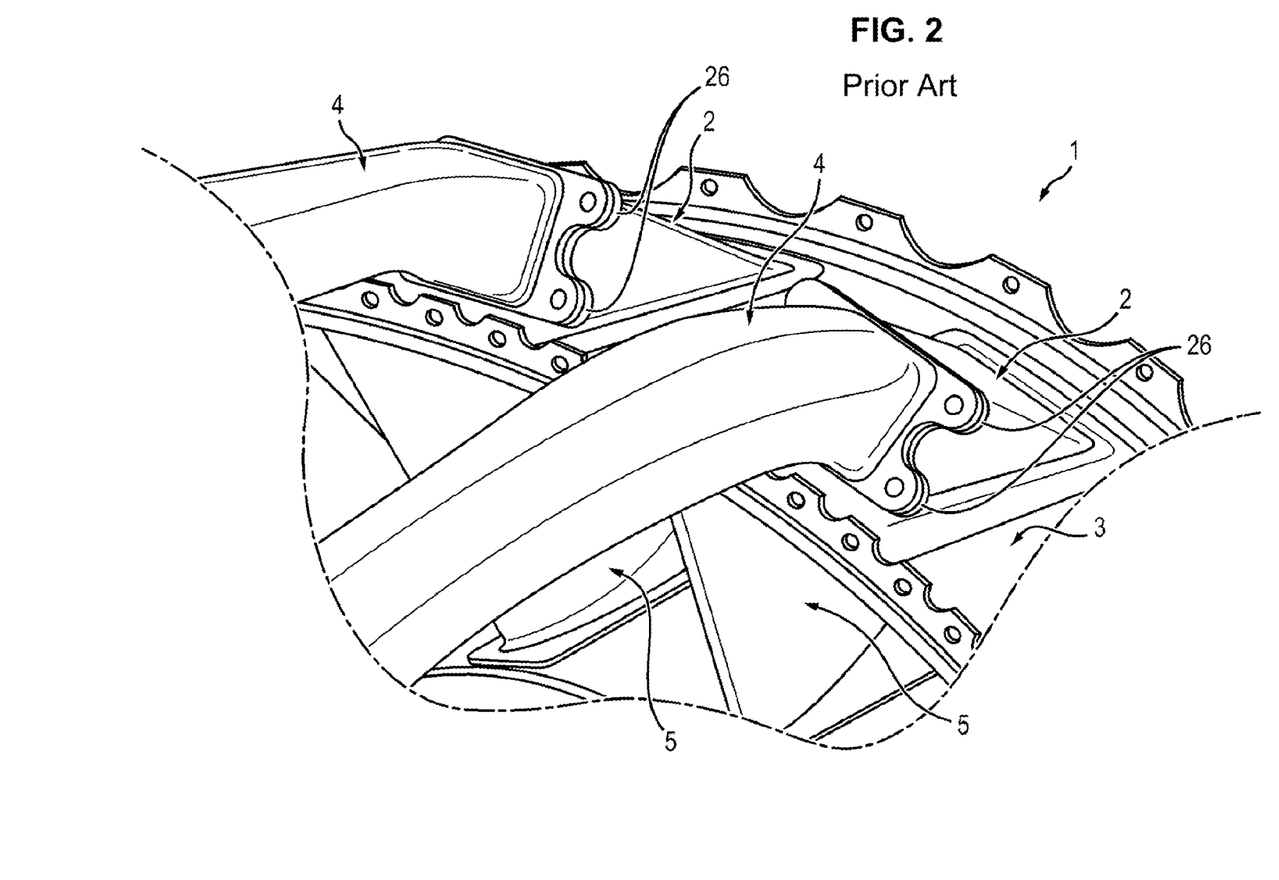
FIG. 2 illustrates a detailed view of the attachment of an outlet tube of a transient exhaust valve to the mouth of the turbine rear frame illustrated in FIG. 1.
Figure 3:
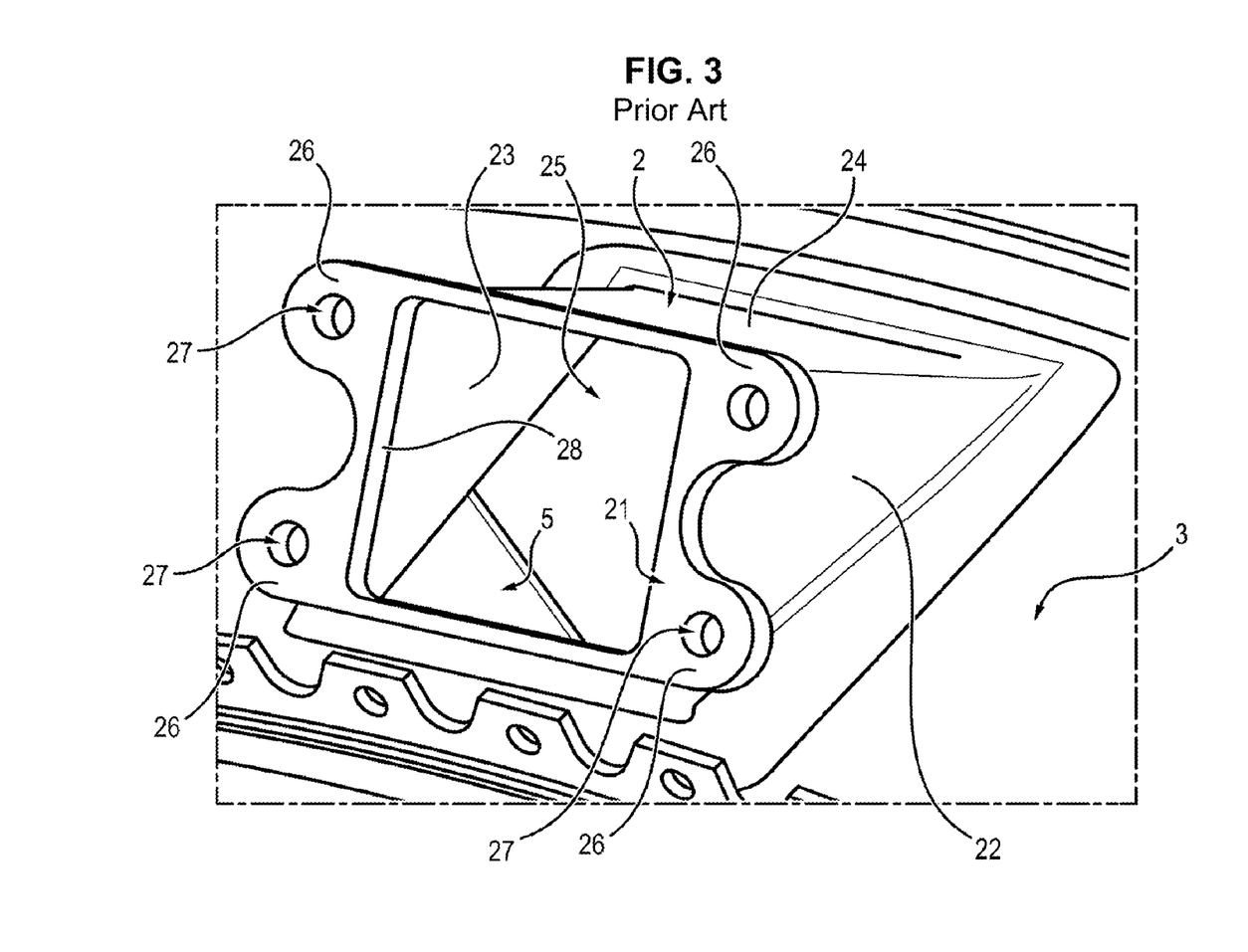
FIG. 3 illustrates a detailed view of a mouth of the turbine rear frame of FIGS. 1 and 2.

A turbine rear frame 1 of a turbine engine is illustrated in FIGS. 1 to 3, which has already been manufactured by the applicant. In the example illustrated in FIGS. 1 to 3, the turbine rear frame 1 is obtained by assembling a mouth 2 (which corresponds to the first element) to an outer shroud 3 of the turbine rear frame 1 (which corresponds to the second element), said mouth 2 being suitable for attaching an outlet tube 4 of a transient exhaust valve of the turbine engine on said outer shroud 3. The transient exhaust valve of the turbine engine (or Transient Bleed Valve, TBV, according to English terminology) is a valve which gives the possibility of discharging a high pressure compressor of the turbine engine during the starting and the accelerations of the turbine engine. In the example illustrated in FIGS. 1 to 3, the turbine rear frame 1 comprises four mouths 2 which are attached on the outer shroud 3. The outer shroud 3 is a hollow and cylindrical axisymmetrical part which delimits the outer surface of the turbine rear frame 1. The outer shroud 3 is connected through a plurality of arms 5 to an internal hub 6, said internal hub 6 being also a cylindrical axisymmetrical hollow part which delimits the internal surface of the turbine rear frame 1.

As visible in FIGS. 1 to 3, the mouths 2 are globally with the shape of a hollow pentahedron with a first face 21 and a second face (not visible in FIGS. 1 to 3) which globally form rectangles and which are tilted relatively to each other (in other words, the first face 21 and the second face are not parallel), as well as three side faces 22, 23 and 24. Among the three side faces 22, 23 and 24, both faces 22 and 23 are globally with a triangular shape and are parallel with each other, and the face 24 is of a globally rectangular shape and is perpendicular to the first face 21 and to both side faces 22 and 23 of a triangular shape.

The mouths 2 comprise a cavity 25 which crosses them entirely while opening at the centre of the first face 21 and at the centre of the second face.

The mouths 2 are attached on the outer shroud 3 by placing each of said mouths 2 facing a pierced hole made in said outer shroud 3 and by welding the contour of the second face of the mouths 2 to the edges of said pierced hole. The second face of the mouths 2 is directed towards the internal hub 6 and is located between two arms 5. The cavity 25 therefore entirely crosses the mouth 2 and the outer shroud 3 so that an air flow entering the mouth 2 through the first face 21 leaves said mouth 2 through its second face while crossing the outer shroud 3. The air flow entering the mouth 2 through the first face 21 is therefore expelled between the outer shroud 3 and the internal hub 6.

The first face 21 of each of the mouths 2 comprises four attachment lugs 26 which are located at the four apices of the first face 21 and which comprise a tapped pierced hole 27 which is located in their centre. These attachment lugs 26 and the pierced holes 27 allow the attachment of the outlet tube 4 of the transient exhaust valve to the mouths 2.

The turbine rear frame 1 illustrated in FIGS. 1 to 3 is manufactured according to the following manufacturing method:

The rough casting mouths 2 are welded to the outer shroud 3. The raw mouths 2 already have their pentahedron shape and comprise the cavity 25 and the attachment lugs 26. However, the attachment lugs 26 do not yet comprise the pierced holes 27.

Once the mouths 2 are assembled to the outer shroud 3, the first surface 21 of said mouths 2 is machined by achieving surfacing in order to correct the irregularities of said first face 21 and to make said first surface 21 functional, and while making pierced holes 27 at the centre of the attachment lugs 26. The surfacing of the first face 21 is achieved by using the outer shroud 3 as a reference frame for machining. In other words, the path which the machining tool has to cover on the part to be machined is located in the space relatively to the outer shroud 3. The pierced holes 27 as for them are made by using a machining reference system based on the walls 28 of the cavity 25.

However, such a manufacturing method may cause inaccuracy in the position of the pierced holes 27. This inaccuracy may be expressed by a shift between the position of the pierced holes 27 during the design of the turbine rear frame 1 and the position of the pierced holes 27 on the turbine rear frame 1 once it is produced. This shift in the position of the pierced holes causes a misalignment with the additional pierced holes made on the outlet tube 4 of the transient exhaust valve.

It is known how to solve this lack of alignment by using a ball joint or sealed metal sheet.

However, these solutions complexify the system, increase its bulkiness and make it heavier.

Another known solution consists of characterizing the shape of the walls 28 of the cavity 25 of the mouths 2 by tactile sensing.

However, the additional tactile sensing step thereby imposed adds a step in the manufacturing method and is further very long to achieve.

The documents WO2005/012696, US2014/165533 and WO2014/143329 are also known, but the teaching of these documents does not solve the above mentioned problem.

GENERAL PRESENTATION OF THE INVENTION

A general object of the invention is to propose a simple solution giving the possibility of ensuring accurate machining of the first assembly of the part to be manufactured in order to ensure the lack of any shift between the first assembly and the conduit which has to be attached to said first assembly.

The invention is particularly useful for manufacturing a turbine rear frame of a turbine engine, notably for an aircraft turbine engine.

More particularly, according to a first aspect, the invention proposes a method for manufacturing a turbine engine part wherein a first rough casting element which comprises a first face and a second face opposite to each other is assembled by the second face on an orifice which has a second element of said part, characterized in that the method comprises the steps of:
machining a through-cavity in the first element which opens at the first face and from the second face of the first element;
machining the first face of the first element so as to form an area suitable for ensuring the attachment of a conduit on the first element, the machining of the cavity and of the first face being achieved by using a machining reference frame based on the second element.

Such a method allows simplification of the manufacturing of the part by using a single reference frame for the machining of the first element on the one hand, and gives the possibility of obtaining an accurate machining of the first face of the first element on the other hand since the deformations generated by the assembling of the first element to the second element are both compensated by the machining of the cavity in the first element and by the fact of using a machining reference system based on the second element.

According to an additional characteristic, the assembling of the first element to the second element is carried out by welding.

According to another characteristic, the second element comprises a connecting device suitable for attaching said second element to the remainder of the turbine engine, the machining reference frame being based on said connecting device.

According to an additional characteristic, attachment lugs are made on the first face of the first element, said attachment lugs being adapted so as to ensure the attachment of the conduit to the first element.

According to a particular characteristic, the machining of the first face of the first element is achieved by leaving a safety distance between the attachment lugs and an outer edge of the first element.

According to another characteristic, the part is a turbine rear frame, the second element is an outer shroud of the turbine rear frame, and the first element is a mouth which is adapted to be attached to an outlet tube of a transient exhaust valve of the turbine engine so that an air flow leaving the transient exhaust valve crosses the mouth while passing through the cavity.

According to a second aspect, the invention proposes a part for a turbine engine comprising a first rough casting element which comprises a first face and a second face opposite to each other and which is assembled by the second face on an orifice which has a second element, characterized in that said part is made according to the manufacturing method according to any of the preceding characteristics, and in that the first element comprises a machined throughcavity, the first face of the first element forming an area suitable for attaching a conduit on said first element.

According to a particular characteristic, the first face of the first element comprises attachment lugs so as to be able to attach the first element to the conduit through pin bushings.

According to an additional characteristic, the part is a turbine rear frame, the second element is an outer shroud of the turbine rear frame, and the first element is a mouth suitable for being attached to an outlet tube of a transient exhaust valve of the turbine engine so that an air flow leaving the transient exhaust valve crosses the mouth while passing through the cavity.

According to a third aspect, the invention proposes a turbine engine comprising a part according to any one of the preceding characteristics.

DESCRIPTION OF THE FIGURES

Other features, objects and advantages of the present invention will become apparent upon reading the detailed description which follows, and with reference to the appended drawings, given as non-limiting examples and wherein.

DESCRIPTION OF ONE OR SEVERAL EXEMPLARY EMBODIMENTS

Figure 4:
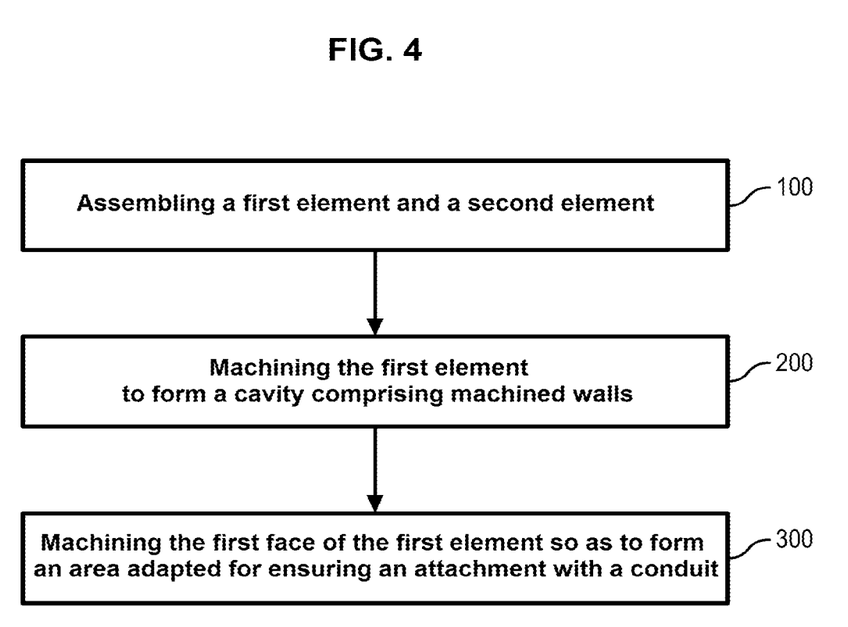
FIG. 4 represents a flow chart of the steps of a first embodiment of the manufacturing method.

In FIG. 4, a first embodiment is illustrated of a method for manufacturing a part for a turbine engine, notably an aircraft turbine engine.

The method for manufacturing the part comprises a first step 100 consisting of assembling a first element and a second element together. The assembling of the first element on the second element must notably give the possibility of attaching a conduit to the part by attaching said conduit to the first element. The assembling may for example be carried out by welding the first element on the second element. The assembling is carried out with a first rough casting assembly. By rough casting, is meant that no step modifying the first element was carried out after manufacturing by casting said first element. The first and the second element may be of diverse shapes. The method is particularly suitable for giving the possibility of assembling an element forming a mouth or an inlet on which will be attached a conduit on a more bulkier element, so as to allow the fluid circulating in the conduit to penetrate into said more bulkier element by passing through said mouth or inlet. Thus, preferentially, the first element is a mouth or an inlet adapted so as to be attached to a conduit, and the second element is a hollow element for which the size is greater than that of the first element.

In order that the attachment of the conduit to the mouth be leak-proof, it is necessary that the machining of said mouth be accurate.

The first element comprises a first face on which the conduit is attached to said first element, a second face which is attached to the second element, and an edge which connects the first face to the second face. The first face and the second face are opposite to each other and parallel. The fact that the walls are parallel facilitates the machining of the first face of the first element when said first element is attached on the second element.

The first element is assembled to the second element through its second face on the edges of an orifice which said second element has. The assembling may be carried out by welding the second face of the first element to the edges of the orifice of the second element.

The method comprises a second step 200 consisting of machining the first element in order to form a cavity inside of said first element, the walls of which are machined. The thereby made cavity entirely crosses the first element. The machining carried out during the second step 200 is carried out by using a machining reference frame which is based on the second element. In other words, the path of the machining tool on the first element in order to machine it is located in the space relatively to the second element. According to a first possible alternative, the first rough casting element may comprise before the second step 200 a preformed cavity in its centre obtained during the foundry operation. In this first alternative, the second step 200 consists in machining the walls of the preformed cavity, so as to form a cavity at the centre of the first element, the walls of which are machined. According to a second possible alternative, the first element is a solid, i.e. not comprising any preformed cavity. Thus, in this second alternative, the second machining step 200 consists of digging a cavity at the centre of the first element, the thereby dug cavity therefore comprising machined walls.

The manufacturing method comprises a third step 300 consisting of machining a first face of the first element in order to form attachment means, so as to form an area suitable for ensuring the attachment of the conduit on the first element. The machining of the first face of the first element during the third step 300 is carried out by using the same machining reference frame as during the second step 200, i.e. the machining reference frame which is based on the second element. According to a possible alternative, the machining during the third step 300 is carried out by achieving surfacing of the first face of the first element, by producing several pierced holes on said first face, and by tapping said pierced holes made on said first face. According to another possible alternative, the machining carried out during the third step 300 comprises the producing of lugs on the first face of the first element by digging into said first face of the first element, and that the pierced holes which are made on said first face during the third step 300 are located at the center of said lugs. The lugs are portions of the first face of the first element which protrude from the remainder of said first face and which have at least partly a rounded or globally rounded shape. The lugs allow attachment of the first element to a conduit by screwing a threaded element into the tapped pierced holes located at the centre of said lugs, for example a pin bushing. The third step 300 may also only consist in the production of pierced holes on the first face of the first element.

Preferentially, the machining of the first face of the first element during the third step 300 is carried out by leaving a safety distance between the lugs and the outer edge of the first element, so that even if the first element deforms during the assembling with the second element, the lugs may be entirely formed in the first face of the first element without being trimmed. This alternative is notably preferred when the assembling of the first element to the second element is achieved by welding since welding deforms the second element and the first element.

By using the second element as a machining reference system for the second step 200 and third step 300 gives the possibility of simplifying the manufacturing method by keeping a single reference frame for the machining of said first element. By using the second element as a machining reference frame for the third step 300 also gives the possibility of increasing the accuracy of the machining of the attachment means as compared with the state of the art. Indeed, the machining reference frame is not based on a rough casting surface. Moreover, by machining the walls of the cavity during the second step 200 before forming attachment means during the third step 300, gives the possibility of compensating for the deformations generated during the assembling of the first and of the second element, thereby ensuring proper alignment of the cavity with the attachment means formed during the third step 300.

According to a possible alternative, the second element comprises a connecting device, for example an attachment clamp, giving the possibility of attaching said second element to the remainder of the turbine engine. Preferentially, the machining reference frame for the second step 200 and the third step 300 is based on the connecting device of the second element. By the fact that the machining reference frame for the second step 200 and the third step 300 is based on the means for attachment of the second element gives the possibility of ensuring better accuracy in the positioning of the cavity formed during the second step 200 and of the attachment means formed during the third step 300 relatively to the remainder of the turbine engine, and thus better accuracy in the positioning relatively to the conduit. Indeed, the positioning of the second element relatively to the remainder of the turbine engine is determined by the positioning of the connecting device connecting said second element to the remainder of the turbine engine.

Figure 5:
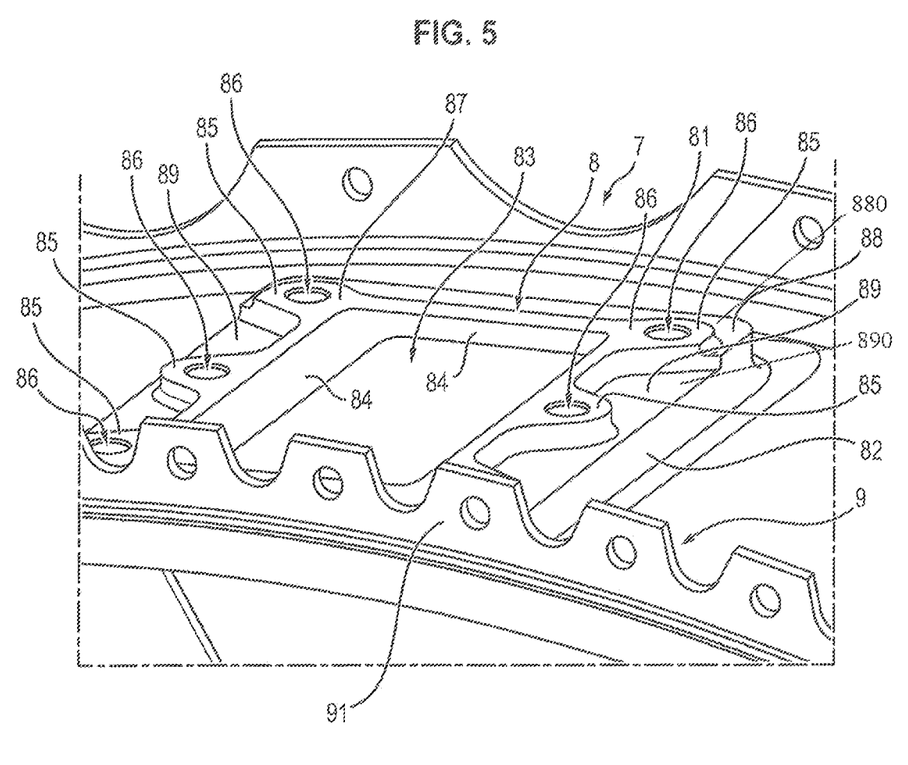
FIG. 5 illustrates a possible embodiment wherein the part to be manufactured is a turbine rear frame of a turbine engine, the first element is a mouth for attaching an outlet tube of a transient exhaust valve, and the second element is an outer shroud of said turbine rear frame.
Figure 6:
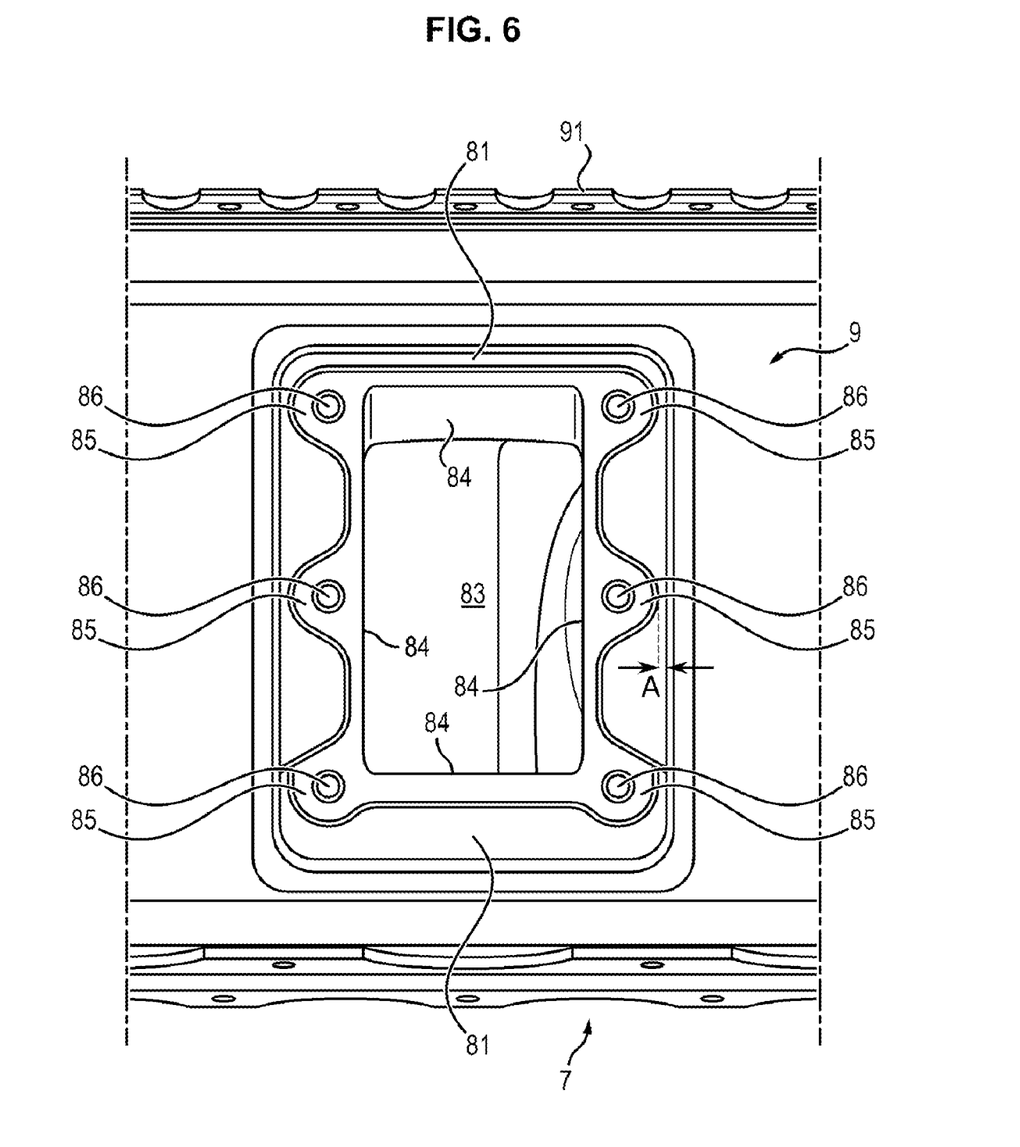
FIG. 6 illustrates a top view of FIG. 5.
Figure 7:
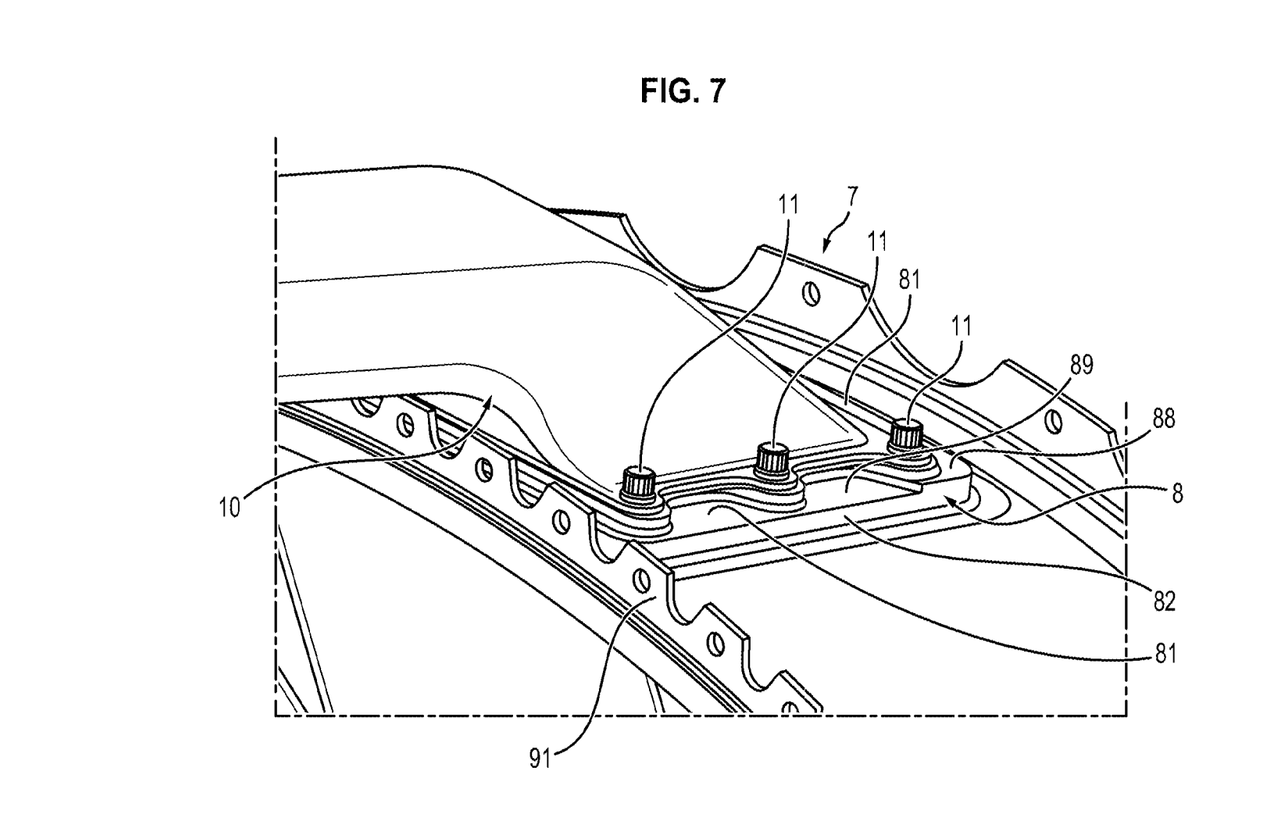
FIG. 7 illustrates the embodiment illustrated in FIGS. 5 and 6 wherein the mouth is attached to an outlet tube of a transient exhaust valve.

In FIGS. 5 to 7, an example is illustrated, wherein the manufacturing method is used for manufacturing a turbine rear frame 7 of a turbine engine for an aircraft by assembling a mouth 8 for attaching an outlet tube 10 of a transient exhaust valve to an outer shroud 9 of said turbine rear frame 7. FIGS. 5 to 7 illustrate the turbine rear frame 7 once the manufacturing method has finished.

In the example illustrated in FIGS. 5 to 7, the part described earlier corresponds to the turbine rear frame 7, the first assembly corresponds to the mouth 8, the second assembly corresponds to the outer shroud 9, and the conduit which is attached to said first element corresponds to the outlet tube 10 of the transient exhaust valve. In the example illustrated in FIGS. 5 to 7, the outer shroud 9 is identical with the outer shroud 3 of the turbine rear frame 1 of the state of the art.

In the alternative shown in FIGS. 5 to 7, the mouth 8 is a hollow hexahedron with a rectangular section which comprises a first face 81, a second face parallel to the first face 81 (not visible in FIGS. 5 to 7), as well as four side faces 82 which are perpendicular to the first face 81 and the second face. The mouth 8 also comprises a cavity 83 in its centre which opens onto the first face 81 and onto the second face of said mouth 8. According to a possible alternative, the cavity 83 is of a rectangular shape.

In this example illustrated in FIGS. 5 to 7, the mouth 8 is attached to the outer shroud 9 by welding during the first step 100 of the manufacturing method. During step 100, when the mouth 8 is welded onto the outer shroud 9, the mouth 8 is still raw x-foundry. The rough casting mouth 8 is for example a hexahedron, six faces of which are planar. The rough casting mouth 8 comprises a preformed cavity resulting from the manufacturing of said mouth 8 by foundry, this preformed cavity opens onto the first face 81 and onto the second face of said mouth 8. However, according to a possible alternative, the rough casting mouth 8 may be solid (without any preformed cavity resulting from the manufacturing of said mouth 8 by foundry). For the assembling of the mouth 8 on the outer shroud 9, the mouth 8 is placed facing an orifice which is made in the outer shroud 9. The orifice formed in the outer shroud 9 has a length and a width substantially identical with the length and with the width of the second face of the mouth 8. The perimeter of the second face of the mouth 8 is then welded to the edges of the formed orifice in the outer shroud 9. Once assembled to the outer shroud 9, the mouth 8 protrudes from the outer shroud 9 by radially extending outwards from said outer shroud 9.

Once the mouth 8 is assembled to the outer shroud 9, said mouth 8 is machined during the second step 200. To do this, the mouth 8 is machined so as to form the cavity 83, the walls 84 of which are machined during the second step 200. In the case when the rough casting mouth 8 comprises a preformed cavity, the walls of the preformed cavity are machined by milling in order to remove material in order to enlarge said preformed cavity and obtain the cavity 83 visible in FIGS. 5 to 7. This material removal step during the second step 200 gives the possibility of compensating for the deformations produced during the first step 100. The machining operation achieved during the second step 200 uses a machining reference frame based on the outer shroud 9. In other words, the path covered by said machining tool during the milling of the mouth 8 is located in the space relatively to the outer shroud 9. Preferentially, the machining reference frame of this machining operation is based on an attachment clamp 91 of the outer shroud 9 through which the turbine rear frame 7 is attached downstream from the low pressure turbine of the turbine engine. If the mouth 8 does not comprise any preformed cavity, the cavity 83 is entirely dug into said mouth 8.

Following the second step 200 wherein the walls 84 of the cavity 83 are machined, the first face 81 is machined so as to form an area suitable for ensuring the attachment of the mouth 8 with the outlet tube 10 of the transient exhaust valve. This machining is carried out by using the machining reference frame based on the outer shroud 9 which was used beforehand during step 200. In other words, the path covered by the machining tool during the machining operation of the third step 300 is located in the space relatively to the outer shroud 9. Preferentially, the machining reference frame of this machining operation is based on an attachment clamp 91 of the outer shroud 9 by which the turbine rear frame 7 is attached downstream from the low pressure turbine of the turbine engine. In the alternative shown in FIGS. 5 to 7, the machining carried out during the third step 300 comprises milling of the first face 81 so as to form lugs 85 (six lugs 85 in FIGS. 5 to 7) and the making of a pierced hole 86 at the centre of said lugs 85. Surfacing of the first face 81 may also be achieved during the third step 300 in order to correct the flatness defects of said first face 81, thereby improving the seal of the attachment with the outlet tube 10.

The lugs 85 are portions of the first face 81 which comprise at least one circular or globally circular portion, and which protrude from the remainder of said first face 81. The lugs 85 are planar surfaces forming an attachment clamp on which a complementary attachment clamp of the outlet tube 10 of the transient exhaust valve is configured so as to be attached. The complementary attachment clamp of the outlet tube 10 comprises lugs which are located facing the lugs 85 when the outlet tube 10 is attached to the mouth 8. The lugs made in the outlet tube 10 comprise pierced holes which are located facing the pierced holes 86 when the outlet tube 10 is attached to the mouth 8.

The milling of the first face 81 of the third step 300 in the alternative illustrated in FIGS. 5 to 7 is carried out in the following way:

A first pass is carried out by removing the material from the first face 81 so as to form the lugs 85, thereby forming a first planar surface 87 comprising the lugs 85 and a first shoulder 880 defining a second surface 88 also planar which is shifted relatively to the first surface 87 while being recessed in the thickness of the mouth 8. The first surface 87 comprises six portions protruding from the remainder of said first surface 87 which form the lugs 85.

A second pass is carried out by again removing material from the first face 81 by following the contour of the lugs 85 formed during the first pass, thereby forming a second shoulder 890 defining a third planar surface 89 which is shifted relatively to the second surface 88 while being recessed in the thickness of the mouth 8. The second pass tends to suppress the second surface 88 by digging in it in order to form the third surface 89 and thereby gain mass. As visible in FIGS. 5 to 7, it is possible that a portion of the second surface 88 remains at the end of the third machining operation 300 since the second pass cannot be carried out on the entirety of the contour of the first surface 87.

The pierced holes 86 may be tapped in order to allow attachment of the outlet tube 10 to the mouth 8 through pin bushings or with simple bolts. A pin bushing is an attachment member comprising a threaded body which is screwed into a tapped hole and which comprises at least one key which may be driven into a groove dug in the thread of the body of the key so as to block the rotation of said threaded body inside said tapped hole in order to prevent said body from unscrewing. In FIG. 7, only screws 11 are visible, these screws 11 each cooperating with a pin bushing located inside a pierced hole 86 of the mouth 8.

The mouths 8 illustrated in FIGS. 5 to 7 are less bulky than the mouths 2 of the state of the art illustrated in FIGS. 1 to 3, thereby giving the possibility of lightening the turbine rear frame 7 made with the mouths 8.

Moreover, in order to take into account the deformations of the outer shroud 9 and of the mouth 8 due to the welding operation, the machining of the first face 81 during the third step 300 is carried out by providing safety distances for the machining during the design of the mouth 8. For example, a minimum safety distance A is provided between the contour of the lugs 85 and the outer edge of the mouth 8 formed with the side faces 82. This safety distance A may ensure that even if the mouth 8 deforms subsequently to the welding, the lugs 85 may nevertheless be entirely formed in the first face 81 without being trimmed.

The mouth 8 according to the alternative illustrated in FIGS. 5 to 7 comprises six lugs 85 and six pierced holes 86, while the mouth 2 according to the state of the art illustrated in FIGS. 1 to 3 only comprises four lugs and four pierced holes, since the fact that the first face 81 and the second face of the mouth 8 are parallel makes the surface of the first face 81 of the mouth 8 greater than the surface of the first face 21 of the mouth 2 of the state of the art (by having the same surface area for the second faces of the mouth 8 and of the mouth 2 of the state of the art). By increasing the number of lugs 85 and of pierced holes 86, and therefore of pin bushings 11 or bolts, it is possible to maintain the same seal level for a greater surface.

Moreover, the fact that the machining reference frame for the second step 200 and the third step 300 is based on the attachment clamp 91 gives the possibility of ensuring more accurate positioning of the cavity 83 machined during the second step 200 and of the attachment means generated during the third step 300 relatively to the outlet tube 10 of the transient exhaust valve.

The invention claimed is:

1. A turbine engine part comprising:
an outer shroud having an orifice formed therein; and
a solid attachment plate comprising a first face and a second face, the first face comprising an attachment area for attaching a conduit to the solid attachment plate, the attachment area being centered with the orifice of the outer shroud,
the second face of the solid attachment plate being welded on the outer shroud such that the second face is welded on edges of the orifice, the edges being comprised in a radially outer surface of the outer shroud,
the solid attachment plate comprising a cavity centered with the orifice of the outer shroud, the cavity being a through-cavity extending from the first face to the second face of the solid attachment plate,
the first face extending on a first surface and the second face extending on a second surface, the first surface being strictly less extended than the second surface.

2. The part according to claim 1, wherein the first face of the solid attachment plate comprises attachment lugs, configured to attach the solid attachment plate to the conduit through pin bushings.

3. The part according to claim 1, wherein the turbine engine part is a turbine rear frame, the conduit is an outlet tube of a transient exhaust valve, and the solid attachment plate is attached to the outlet tube so that an air flow leaving the transient exhaust valve crosses the solid attachment plate by passing through the cavity.

4. The part according to claim 2, wherein the attachment lugs comprise six attachment lugs, each of the attachment lugs being attached to the conduit through pin bushings.

5. The part according to claim 4, wherein each attachment lug of the six attachment lugs comprises a pierced hole, and four of the six pierced holes virtually define four corners of a rectangle in a plane parallel to the first face, the two other pierced holes of the six pierced holes being positioned on sides of the rectangle.

6. The part according to claim 5, wherein the rectangle is not centered with the cavity.

7. The part according to claim 1, comprising a first shoulder located between the first face and the second face, the first shoulder extending around the orifice and defining a third surface of the part parallel to the first face, the third surface extending from the first face away from the orifice.

8. The part according to claim 7, comprising a second shoulder located between the first face and the second face, the second shoulder extending around the orifice and defining a fourth surface of the part parallel to the first face, the fourth surface extending from the third surface away from the orifice.

9. The part according to claim 1, wherein the second face is not centered with the first face.

10. A turbine engine comprising the part according to claim 1.

* * * * *